US010956564B2

(12) United States Patent
Dhoble et al.

(10) Patent No.: US 10,956,564 B2
(45) Date of Patent: Mar. 23, 2021

(54) SYSTEMS AND METHODS FOR KEY-BASED ISOLATION OF SYSTEM MANAGEMENT INTERRUPT (SMI) FUNCTIONS AND DATA

(71) Applicant: DELL PRODUCTS L.P., Round Rock, TX (US)

(72) Inventors: Girish S. Dhoble, Austin, TX (US); Ricardo L. Martinez, Leander, TX (US); Nicholas D. Grobelny, Austin, TX (US); Abeye Teshome, Austin, TX (US)

(73) Assignee: Dell Products L.P., Round Rock, TX (US)

( * ) Notice: Subject to any disclaimer, the term of this patent is extended or adjusted under 35 U.S.C. 154(b) by 231 days.

(21) Appl. No.: 16/182,236

(22) Filed: Nov. 6, 2018

(65) Prior Publication Data

US 2020/0143042 A1    May 7, 2020

(51) Int. Cl.
| | | |
|---|---|---|
| *G06F 21/00* | (2013.01) | |
| *G06F 21/54* | (2013.01) | |
| *G06F 21/62* | (2013.01) | |
| *G06F 21/57* | (2013.01) | |
| *G06F 12/14* | (2006.01) | |
| *G06F 21/60* | (2013.01) | |

(52) U.S. Cl.
CPC .......... *G06F 21/54* (2013.01); *G06F 12/1408* (2013.01); *G06F 21/572* (2013.01); *G06F 21/602* (2013.01); *G06F 21/6281* (2013.01); *G06F 2212/1052* (2013.01); *G06F 2212/402* (2013.01)

(58) Field of Classification Search
CPC .... G06F 12/1408; G06F 21/54; G06F 21/572; G06F 21/602; G06F 21/6281
See application file for complete search history.

(56) References Cited

U.S. PATENT DOCUMENTS

| | | | | |
|---|---|---|---|---|
| 2005/0111664 A1* | 5/2005 | Ritz | .................... | G06F 21/6209 380/255 |
| 2016/0246964 A1* | 8/2016 | Martinez | ............. | G06F 13/4282 |

OTHER PUBLICATIONS

Wikipedia, "Symmetric-Key Algorithm", Printed from Internet Oct. 17, 2018, 4 pgs.

* cited by examiner

*Primary Examiner* — Jeffrey C Pwu
*Assistant Examiner* — Thong P Truong
(74) *Attorney, Agent, or Firm* — Egan, Enders & Huston LLP.

(57) ABSTRACT

Systems and methods that may be implemented to use encryption to isolate SMI functions, libraries and data from each other, such as during operation of systems management mode (SMM). Isolation of SMI function, library and data (and limitation of SMI function/library privileges) may be achieved in SMI at runtime by decrypting only that code and data needed for performing the required action/s in response to a SMI received from a calling process by a host processor (e.g., CPU).

19 Claims, 5 Drawing Sheets

(1)

SYSTEMS AND METHODS FOR KEY-BASED ISOLATION OF SYSTEM MANAGEMENT INTERRUPT (SMI) FUNCTIONS AND DATA

FIELD

This invention relates generally to information handling systems and, more particularly, to system management interrupt (SMI) functions in information handling systems.

BACKGROUND

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

All system management interrupt (SMI) functions executed by a central processing unit (CPU) of an information handling system have access to all memory pages, including needed pages and other memory pages that that should not be accessed. This includes access to other SMI function code without any restrictions even if there is no need to have this open access. Also, all functions have access to all the SMM data region of system management memory (SMRAM) of host memory. All the SMI functions and the data accessed by the SMI functions are in plain text (i.e., not encrypted).

FIG. 1 illustrates a conventional method for handling a SMI. As shown in FIG. 1, upon SMI entry in step 50, the host CPU 11 of the information handling system 10 fetches Function A which is shown now running in FIG. 1. As shown by the paths of the arrows in FIG. 1, Function A is given access to memory pages within system management mode (SMM) code region 13 and SMM data region 14 of host SMM memory 17 (also known as SMRAM), as well as host kernel/user data region 15, of host system memory 12. As shown Function A has access to SMM data region 14 that contains Data X (via path 1) and Data Y (via path 2) and can read, modify and erase Data X and Data Y. Function A can also access, read, modify, and erase Data Z of host kernel/user data region 15 (via Path 3), other user Data of host kernel/user data region 15 (via Path 4), or even code in SMM code region 13 (via Path 5). Function A should have access to data of paths 1 and 2, since they are necessary for normal operation. However, allowing Function A to unnecessarily access data of paths 3, 4, and 5 could have unintended consequences (e.g., malware could be written to exploit these paths to compromise data or code on the system). Further, once Function A calls Library E in step 60, control is passed from Function A to the other Library E (via Path 6), at which time it is also possible for Library E to pass control unintentionally to Library F (path 7), with similar consequences.

FIG. 2 illustrates conventional methodology 20 for processing and executing a request for access to a SMI function in SMM code region 13. Conventional methodology 20 occurs during a SMM mode that was previously triggered in the OS in response to a SMI. As shown, methodology 20 begins in step 22 where the system host CPU may receive a request from a calling process (e.g., application, etc.) to access a needed SMI function. Next, in step 24, the operating system (OS) on the host CPU authenticates the calling process by checking whether the process has administrative level privileges, and fetches and loads the requested SMI function in step 26. The SMI function terminates after being executed, and methodology 20 resumes to the OS in step 28.

Process authentication by the OS is known, together with execution and returning of SMI functions. Control flow integrity exists for software contexts that do not include SMM. It is known to use CPU firmware microcode to allow page-level control for SMM. CPU firmware microcode defines tables for general bounding of SMM within system memory, i.e., it is known to use CPU embedded firmware microcode to allow page-level control for SMM by allowing SMM access to be restricted to only those page ranges inside of SMM, but the CPU embedded firmware microcode does not have authority to control functionality within SMM. This CPU embedded firmware microcode logic executes every time a SMM instruction runs, checks CPU registers that contain memory bounds to determine if the instruction is trying to access outside of the allowed bounds for SMM operations, and raises an error if the instruction is trying access something outside the allowed bounds. Operating system table memory management and paging are utilized to limit access to page ranges outside of SMM, but does not have authority to control functionality within SMM.

SUMMARY

Disclosed herein are systems and methods that may be implemented to use encryption (e.g., symmetric encryption, asymmetric encryption, etc.) to isolate SMI functions, libraries and data from each other, such as during operation of systems management mode (SMM). The disclosed systems and methods may achieve isolation of SMI functions, libraries and data from each other (and limitation of SMI function/library privileges) in SMI at runtime by decrypting only that code and data needed for performing the required action/s in response to a SMI received from a calling process by a host processor (e.g., CPU). This is in contrast to conventional SMI and SMM operations during which there is no way to isolate running SMI functions, libraries and data from other SMI functions, libraries and data, and during which too much privilege may be accorded to running SMI functions and libraries.

In one embodiment, decryption of code and data may be accomplished by an authentication token (e.g., a cryptographic key such as symmetric cryptographic key or asymmetric cryptographic key) that is passed through certain of the host processor registers, e.g., using a "mailbox" type technique. Prior to this time, initial provisioning of encrypted functions, libraries and data may be performed by "static loading" (e.g., at BIOS build time), or by "dynamic loading" (e.g., at runtime using a separate application programming interface).

In one embodiment, encryption may be employed to encrypt the code region of each SMI function and/or library (function/library) or a group of SMI functions/libraries (depending on the action performed) with a different cryptographic key. In a further embodiment, this technique may be extended to also encrypt the SMI data region associated with the SMI function/library, e.g., with the same key used to encrypt the SMI function/library. It is noted that the encrypted SMI data is different from the data returned by the SMI function/library to the CPU or calling process, which may not be encrypted.

In one embodiment, when a calling process wants to execute a given SMI function/library, it uses the CPU registers to pass an authentication key (e.g., such as symmetric cryptographic key or asymmetric cryptographic key) to a SMI master function handler. The SMI master function handler may respond by using the provided key to decrypt the given SMI function/library and any SMI data region/s required by the given SMI function/library, so that the decrypted SMI function/library may then be executed together with access to any needed decrypted SMI data. In such an embodiment, the key acts as an authentication token which decrypts only the given SMI function/library and the SMI data it requires for execution. Other SMI functions/libraries and SMM data remain encrypted, e.g., by different authentication keys. Once execution of the SMI function/library has completed, the SMI master function handler will use the same key to encrypt the given SMI function/library again.

In one embodiment, a SMI master function handler may handle the case where the presence of multiple different SMI functions/libraries are needed by decrypting those different SMI functions/libraries using different corresponding keys passed by the calling processes. This advantageously provides a layer of isolation between the SMI functions/libraries and prevents unauthorized access to SMI data or code regions that are not needed by an executing SMI function/library, protecting the rest of the system from malicious code attempting to use SMM for privilege escalation by decrypting only the SMI code and SMI data needed for performing the required action.

In the practice of the disclosed systems and methods, initial encryption and provisioning of encrypted functions/libraries and SMI data may be performed using any suitable technique. For example, in one embodiment 'Static Loading' may be employed by integrating each encrypted SMI function/library together with any SMI data at BIOS built time with the cryptographic key known to the vendor or system manufacturer/assembler. In another embodiment, 'Dynamic Loading' may be employed where a vendor/manufacturer/assembler may add the encrypted SMI function/library together with any SMI data to the SMM code region of system memory through a different SMI application programming interface (API). In this regard, during dynamic loading a different API (e.g., a SMI management API) may be used for adding encrypted SMI functions/libraries and/or SMI data. In one embodiment, a single API may be employed to add multiple encrypted SMI functions/libraries and/or SMI data.

In one respect, disclosed herein is an information handling system, including: a system memory; and a programmable integrated circuit coupled to the system memory, the programmable integrated circuit being programmed to operate in a system management mode (SMM) to respond to a request received from a calling process executing on the programmable integrated circuit for access to at least one encrypted system management interrupt (SMI) function/library stored in the system memory by: decrypting the requested SMI function/library from the system memory, executing the decrypted requested SMI function/library from the system memory, and then re-encrypting the requested SMI function/library in the system memory.

In another respect, disclosed herein is a method, including operating a programmable integrated circuit of an information handling system in a system management mode (SMM) to respond to a request received from a calling process executing on the programmable integrated circuit for access to at least one encrypted system management interrupt (SMI) function/library stored in the system memory by: decrypting the requested SMI function/library from the system memory, executing the decrypted requested SMI function/library from the system memory, and then re-encrypting the requested SMI function/library in the system memory.

DESCRIPTION OF ILLUSTRATIVE EMBODIMENTS

Figure 1:
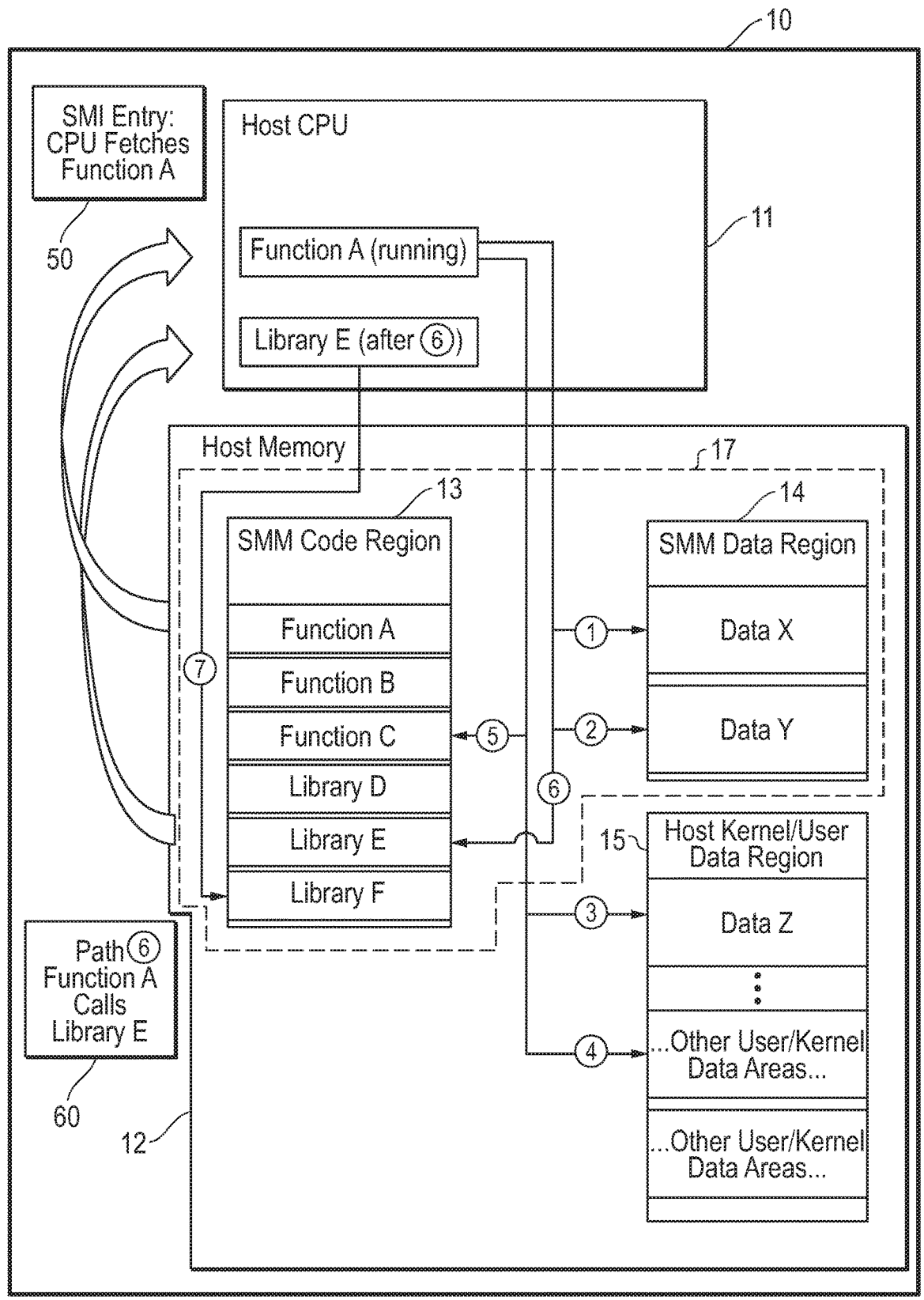
FIG. 1 illustrates a conventional method for handling a SMI.
Figure 2:
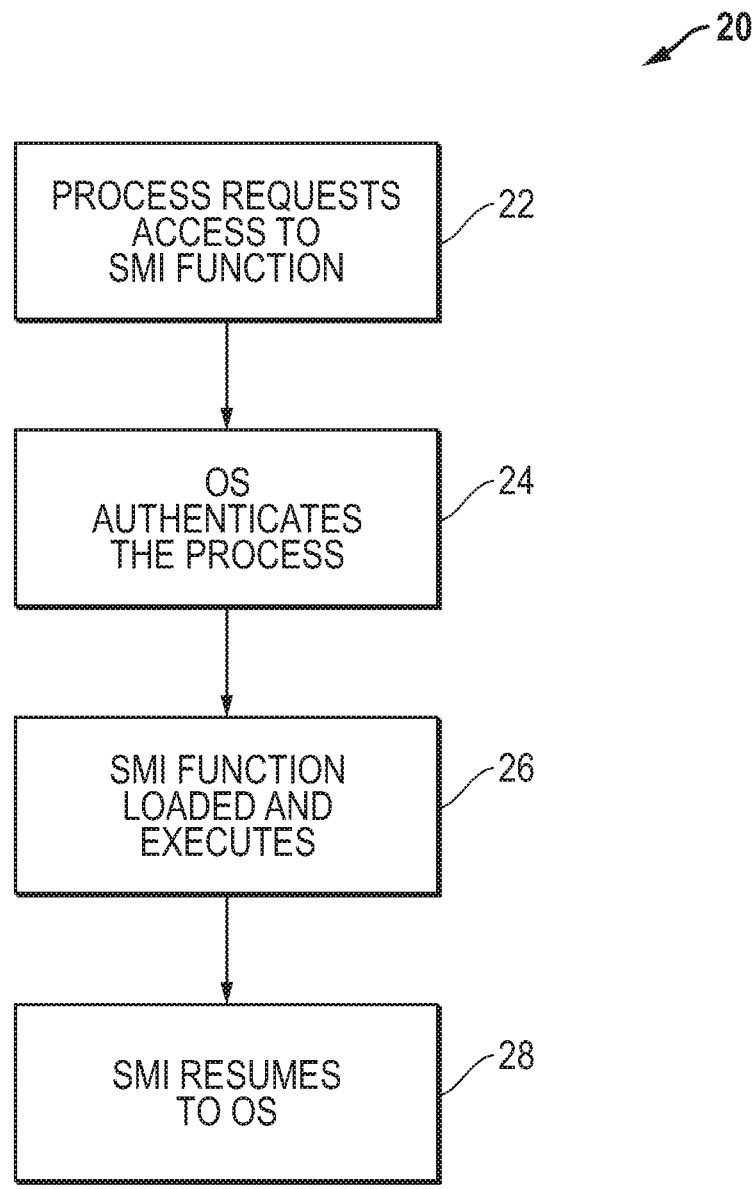
FIG. 2 illustrates conventional methodology for processing and executing a request for access to a SMI function.
Figure 3:
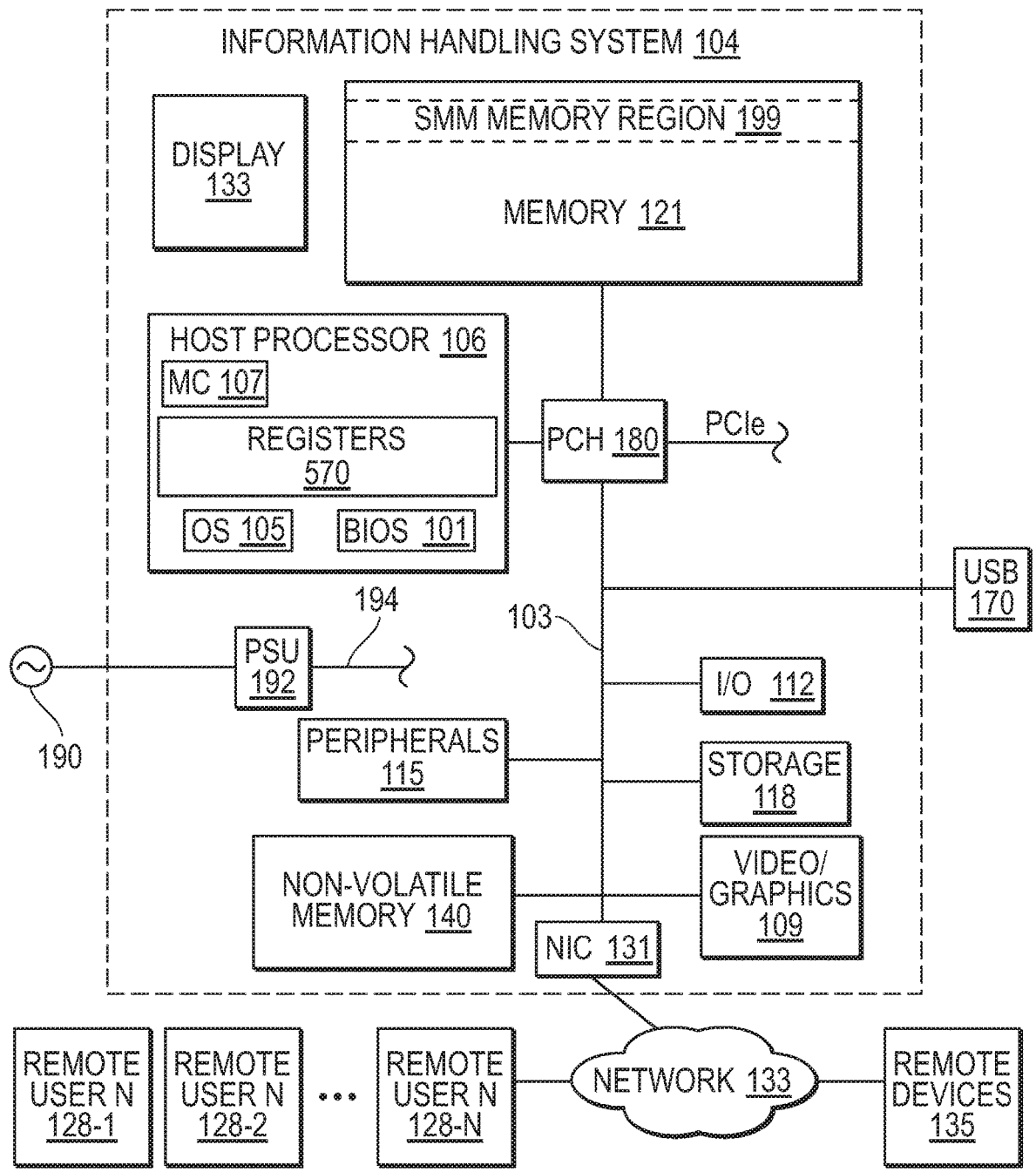
FIG. 3 is a block diagram of an information handling system according to one exemplary embodiment of the disclosed systems and methods.

FIG. 3 is a block diagram of an information handling system 104 (e.g., such as a server, desktop computer, laptop, notebook, etc.) as it may be configured according to one exemplary embodiment to control flow integrity during SMM mode. As shown, system 104 may include one or more host processing device/s 106 (e.g., AMD or Intel-based CPU such as Itanium or any other type of suitable host processing device), one or more buses or communication media 103 (e.g., PCIe bus, USB, SMBus, SATA, other appropriate data buses such as memory bus, etc.), video/graphics hardware 109 (e.g., video adapter or graphics processor unit), storage 118 (e.g., solid state drive (SSD), hard disk drive and/or optical drive, etc.), system memory 121 (e.g., volatile memory such as dynamic random access memory "DRAM"), local input/output (I/O) 112, peripherals 115 (e.g., keyboard, mouse, etc.), non-volatile memory 140 (e.g., such as Flash memory), and remote access controller (RAC) (not shown). Examples of a remote access controller include an integrated Dell Remote Access Controller (iDRAC) available from Dell Technologies Inc. of Round Rock, Tex., etc.). In one embodiment, the video/graphics hardware 109 (and/or integrated graphics within host processing device 106) may control a video display 133 for display of information (e.g., GUI) to a local user, and the local user may provide user input via peripherals 115.

In the exemplary embodiment of FIG. 3, host processing device/s 106 is configured to load and run a Basic Input Output System (BIOS) 101 (e.g., UEFI firmware) and host OS 105 (e.g., Windows-based OS, Linux-based OS, etc.), among others. BIOS 101 includes SMI functions and SMI libraries (i.e., code shared between multiple SMI functions) that may be stored with BIOS 101 on non-volatile and electronically programmable memory 140. Host processing device/s 106 also includes embedded non-volatile firmware hardware microcode 107 that is executed by host processing device/s 106 during boot and run-time. Embedded microcode 107 may be furnished, for example, as part of embedded CPU hardware of a CPU provided by chip manufacturers such as Intel, AMD, etc. As described further herein, embedded hardware microcode 107 includes master function handler logic that is utilized by the disclosed systems and methods for the disclosed key-based isolation of SMI functions and data. As will be described further herein, during a SMI event a calling process may cause OS 105 to store function information/parameters (e.g., pointer/s to index identifying a requested function and any other information needed for proper system management mode context for executing of the requested SMI function), together with a cryptographic key (e.g., such as symmetric key or asymmetric key) corresponding to the requested SMI function, in the registers 570 of host processor 106. The host processor 106 may execute the SMI master handler of the embedded firmware microcode logic to read the host processor registers 570 to determine the system management mode (SMM) context and to read and use the stored key to decrypt the requested SMI function for execution during SMM.

Bus/es 103 provides a mechanism for the various components of system 104 to communicate and couple with one another. As shown, host processing device 106 may be coupled in an embodiment to bus/es 103 via an embedded platform controller hub (PCH) 180 and may be coupled to facilitate input/output functions for the processing device/s 106 with various internal system components of information handling system 104 through bus/es 103 such as PCI, PCIe, SPI, USB, low pin count (LPC), etc. Examples of such system components include, but are not limited to, NVRAM, BIOS SPI Flash, NVDIMMS, DIMMS, PCIe Devices, etc. The PCH 180 is directly coupled to system memory 121 as shown. System memory 121 includes memory pages of a SMM code region 520 and a SMM data region 530 that are contained within a SMM region 199 (also known as SMRAM) as further illustrated in FIG. 5.

In one embodiment, host processing device/s 106 may be an in-band processing device configured to run a host operating system (OS) 105. Besides memory 121 (e.g., random access memory "RAM"), processor 106 may include cache memory for storage of frequently accessed data. Information handling system 104 may also include a network access card (NIC) 131 that is communicatively coupled to network 133 (e.g., Internet or corporate intranet) as shown to allow various components of system 104 to communicate with external and/or remote device/s 135 across network 133. Other external devices, such as an external universal serial bus (USB) device 170 may be coupled to processing device/s 106 via bus/es 103. In this embodiment, information handling system 104 also includes power supply unit (PSU) 192 that is coupled to receive power from AC mains 190 and to perform appropriate power conversion and voltage regulation to produce regulated internal power 194 for use by other power-consuming components of system 104. System 104 may also include a baseboard management controller (BMC) (not shown). As shown, in the embodiment of FIG. 3 the host system 104 may optionally provide access to a plurality of remote users 128-1 through 128-N, although access may be provided to a single user 128 in other embodiments. In this regard, remote users may manage, administer, use, and/or access various resources of host system 104 (e.g., either native or virtual) from a remote location, e.g., via network 133 and/or other suitable communication medium or media.

Figure 4:
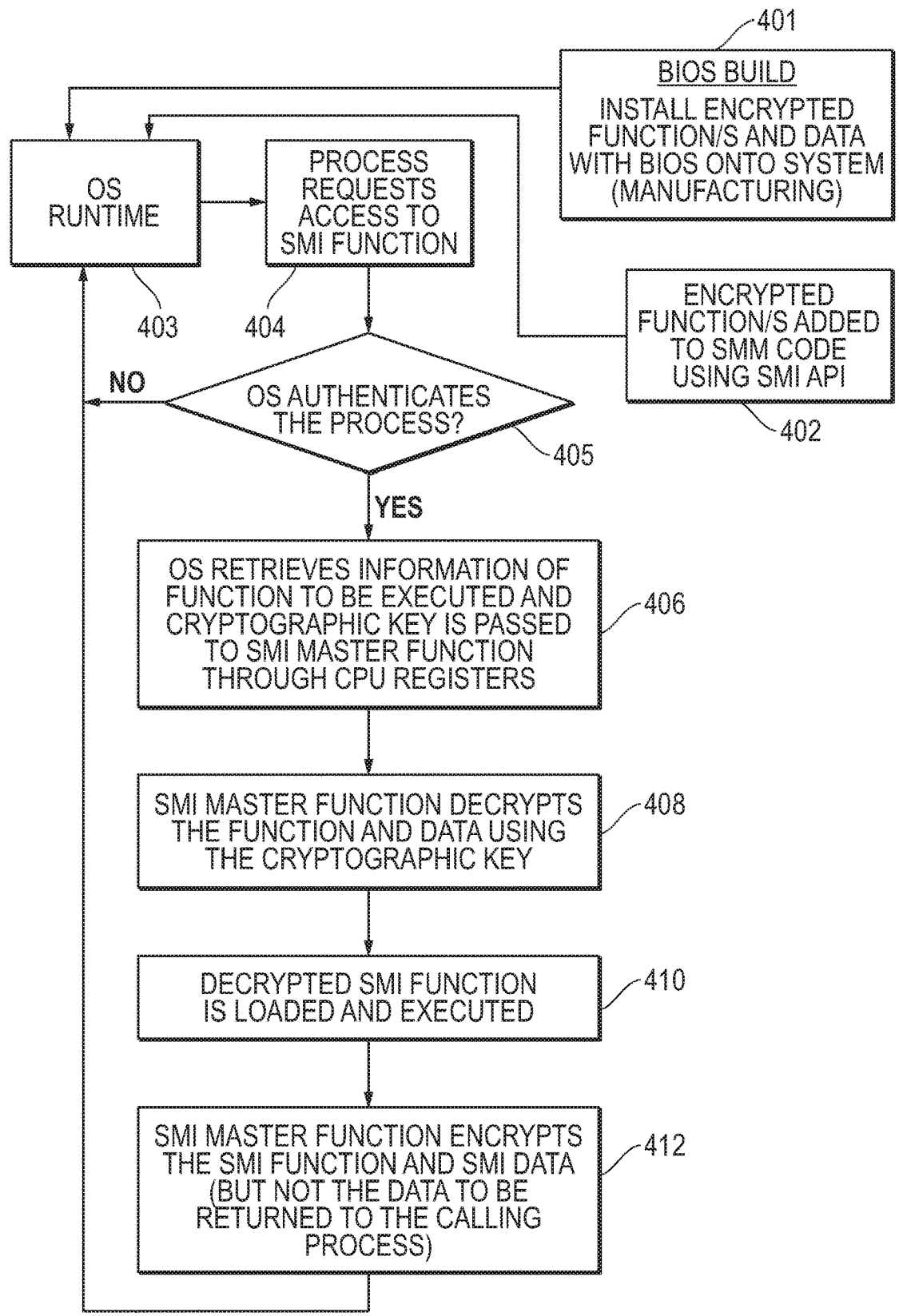
FIG. 4 illustrates methodology according to one exemplary embodiment of the disclosed systems and methods.
Figure 5:
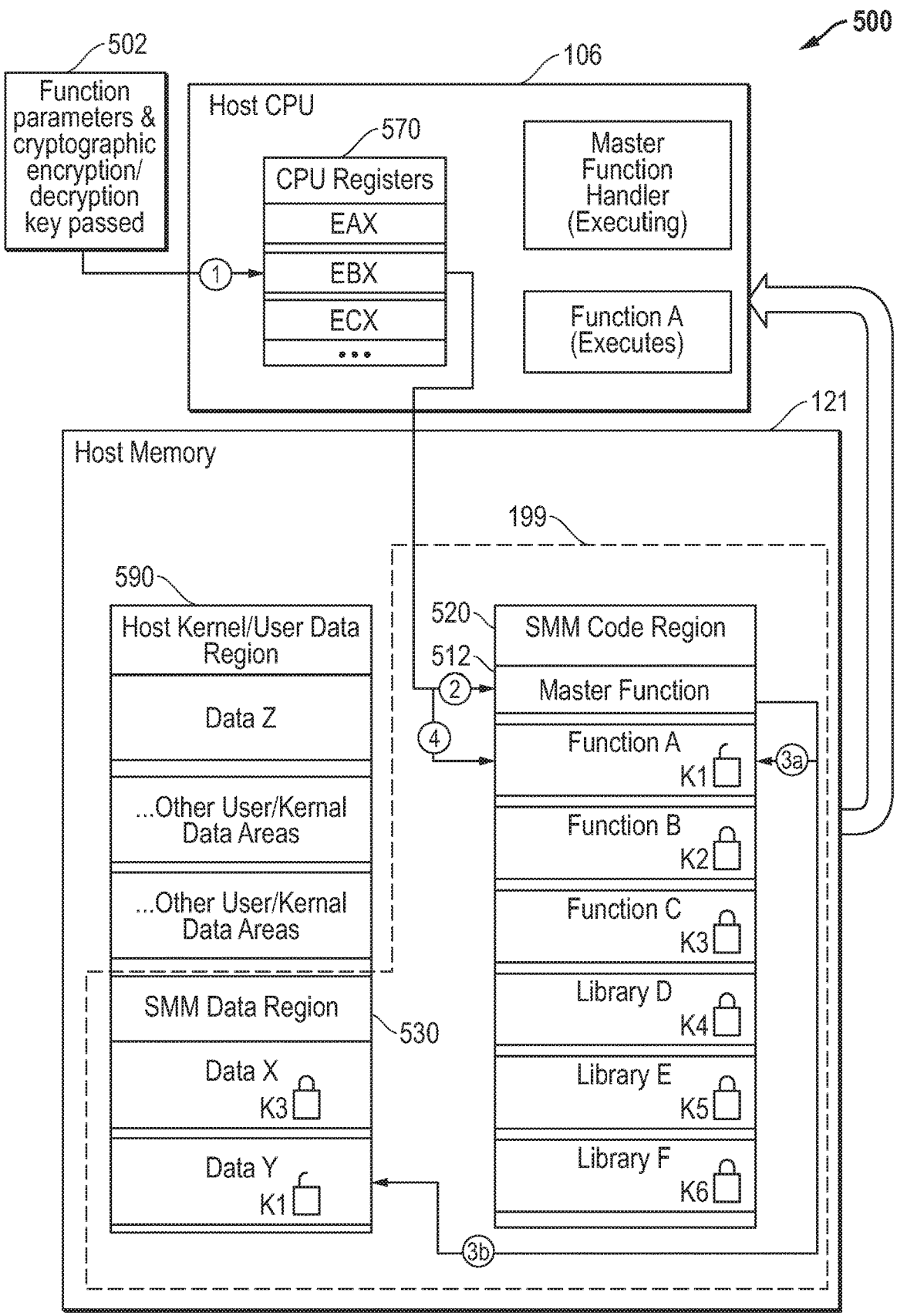
FIG. 5 illustrates architecture and methodology according to one exemplary embodiment of the disclosed systems and methods.

FIGS. 4 and 5 together illustrate methodology and architecture for handling a SMI event according to one exemplary embodiment disclosed herein. In the exemplary architecture of FIG. 5, host memory 121 includes each of host kernel/user data region 590, as well as SMM memory region (SMRAM) 199 that includes SMM code region 520 and SMM data region 530. Further, master function handler 512 is also shown stored as software in SMM code region 520 as shown. In this regard, master function handler 512 may in one embodiment be a part of SMM code modified to handle cryptographic key transfer from registers 570 of host processor 106 and decryption and re-encryption processing steps described herein. As described herein, cryptographic keys may be any type of cryptographic key (e.g., such as symmetric key or asymmetric key) that is suitable for implementing the encryption and decryption techniques described herein.

In FIG. 5, each of SMI functions A, B and C stored within SMM code region 520 are encrypted with a different cryptographic key (i.e., K1, K2 or K3, respectively) from each of the other SMI functions and libraries as shown. Each of SMI libraries D, E and F stored within SMM code region 520 are also encrypted with a different cryptographic key (i.e., K4, K5 or K6, respectively) from each of the other SMI functions and libraries as shown. In FIG. 5, each of Data X and Data Y stored in SMM data regions 530 are encrypted with a different cryptographic key (i.e., K3 and K1, respectively) from each other, but the same as one of the SMI functions that requires the data. For example, SMI function A requires Data Y, so both are encrypted with the same cryptographic key K1. Similarly, SMI function C requires Data X, so both are encrypted with the same cryptographic key K1. In this way a given SMI function may be decrypted together its required data, and any SMI libraries in similar manner. However, this is not required, and in another embodiment all SMI data and SMI functions/libraries may be encrypted with different keys from each other. In yet another alternative embodiment, a group of two or more SMI functions/libraries may be encrypted with the same cryptographic key to allow decryption of these multiple SMI functions/libraries where they are utilized together to perform a function in response to a particular type of SMI received from a calling process. In a further embodiment, a given shared code that is shared by multiple SMI functions (e.g., SMI library code) may be encrypted and decrypted with its own unique key different from all other keys unless, for example, the multiple SMI functions that utilize the given shared code are themselves encrypted as a group of SMI functions with the same key, e.g., in which case the shared code may also be encrypted and decrypted with the same key as the SMI functions.

As shown in FIG. 4, methodology 400 begins with initial provisioning of encrypted SMI functions and SMI data into system BIOS 101 by step 401 and/or 402. In one embodiment, initial provisioning may be performed in optional step 401 by "static loading" during BIOS build or compile time, where each of the encrypted SMI functions and SMI data are integrated at BIOS build time (e.g., during system manufacturing or assembly) and in which case the manufacturer, vendor or assembler knows the cryptographic key (e.g., such as symmetric key or asymmetric key) used for each different SMI function and SMI data. In another embodiment, initial provisioning may be performed in optional step 402 by "dynamic loading", where each of the encrypted SMI functions, SMI libraries and SMI data are added dynamically at runtime to system BIOS through a SMI application programming interface (API).

After the encrypted SMI functions/libraries and data are provisioned in step 401 and/or 402, step 403 occurs with normal OS runtime occurring following pre-boot of the system BIOS. During pre-boot, the encrypted SMI functions/libraries and SMI data may be loaded from the system BIOS into system memory 121 as shown in FIG. 5. In step 404, a process (e.g., such as temperature measurement and fan control, power management, etc.) executing on a programmable integrated circuit of system 104 requests access from host processor 106 to a given SMI function (e.g., SMI function A of FIG. 5) corresponding to a current SMI event. For example, a particular SMI function may be provided for alerting on high CPU temperature and taking actions like turning on or controlling speed of processor cooling fans. Such a particular SMI function may be decrypted and executed to access the CPU temperature sensor data and a separate processor fan management function. OS 105 responds to this request in step 405 by authenticating the requesting process (e.g., by verifying process privileges). If the process fails authentication in step 404, then methodology 400 returns to normal OS runtime of step 403.

However, assuming the process is authenticated in step 405, then methodology 400 proceeds to step 406 where OS 105 retrieves a cryptographic key (e.g., such as symmetric key or asymmetric key) from the calling process that corresponds to the requested function, together with other information/parameters of the requested function, e.g., such as index identifying the requested function and any other information needed for proper SMM context for executing of the requested SMI function). In one embodiment, cryptographic keys corresponding to different SMI functions/libraries may be securely managed at the endpoint or cloud. At this time, OS 105 also stores the retrieved key and required function information/parameters corresponding to the currently requested function in host processor registers 570 (e.g., extended register EBX) via path (1a) as shown in detailed step 502 of FIG. 5. Only the key needed for the requested SMI function and SMI data is stored in the host processor registers 570 in step 406. No other cryptographic keys for the other currently not-needed SMI functions are stored in host processor registers 570 at this time. If multiple keys are required at any given time (e.g., such as when two or more different SMI functions are simultaneously required by a calling process or a SMI function and a shared SMI library code or SMI data are simultaneously required by a calling process), then each of two or more corresponding extended registers EAX, EBX, ECX, etc. may be simultaneously populated differently, with each different register holding only the SMI function/library/code information/parameters and cryptographic key for a portion of the requested SMI functions/libraries, SMI shared code or SMI data.

Next in step 408 of FIG. 4, the SMI master function handler 512 is invoked or called via path (2) of FIG. 5 by host processor 106 and executes to access the host processor registers 570 to retrieve the cryptographic key and SMI function/library/code parameters/information of step 406 from the host processor register 570, and to use the retrieved key to decrypt the requested SMI function together with any corresponding needed data region that is required by the SMI function/library for performing the requesting operation requested by the calling process. The identity of needed SMI function/library and needed SMI data may be determined by the SMI master function handler 512 from the retrieved function parameters/information. For example, in the embodiment of FIG. 5, master function 512 retrieves SMI function information/parameters and cryptographic key K1 from the host processor register EBX, and determines from this retrieved information/parameter that SMI function A is required by the current calling process to be loaded and executed with access to Data Y. Master function handler 512 therefore uses cryptographic key K1 to decrypt SMI function A via path (3a) and to decrypt Data Y via path (3b) as shown. For purposes of illustration, master function handler 512 and SMI function A are shown in FIG. 5 as loaded and executing on host processing device 106.

Next, in step 410, the decrypted SMI function/library is fetched and executed by host processor 106 with access to any corresponding needed decrypted SMI data. For example in the embodiment of FIG. 5, SMI function A is loaded into host processor 106 via path (4) and executed by host processor 106 as shown.

After the requested SMI function/library executes with any needed decrypted SMI data in step 410, SMI master function handler 512 uses the same cryptographic key in step 412 to re-encrypt the requested SMI function/library and its corresponding data in SMM memory regions 199 (e.g., using key K1 to re-encrypt SMI function A and Data Y in FIG. 5). Any data that results from the execution in step 410 of the requested SMI function/library may be returned by the SMI master function handler 512 to the calling process in unencrypted form. At this time, methodology 400 then returns to normal OS runtime step 401 of FIG. 4. Steps 404 to 412 repeat each time a given process executing on a programmable integrated circuit of system 104 requests access from host processor 106 to a given SMI function/library corresponding to a different SMI event.

It will be understood that the embodiments of FIGS. 3-5 are exemplary only and that other embodiments are possible. For example, in one alternative embodiment, a portion or all of the logic of master function handler 512 may be integrated into silicone firmware (e.g., embedded hardware microcode 107) or in logic of a host processor 106. Such logic may include, for example, one or more of the tasks described in relation to steps 406, 408, 410 and/or 412 of FIG. 4. Particular tasks that may be so integrated into silicon firmware or other logic of host processor 106 include, but are not limited to, SMI function and data decryption, loading decrypted functions and data for execution, returning non-encrypted data from the executing SMI function to the calling process, and re-encrypting the decrypted SMI function and any associated SMI data.

It will also be understood that the steps of FIGS. 4 and 5 are exemplary only, and that any combination of fewer, additional and/or alternative steps may be employed that are suitable for controlling flow integrity and access to system memory pages during systems management mode (SMM).

It will be understood that one or more of the tasks, functions, or methodologies described herein (e.g., including those described herein for component 106, etc.) may be implemented by circuitry and/or by a computer program of instructions (e.g., computer readable code such as firmware code or software code) embodied in a non-transitory tangible computer readable medium (e.g., optical disk, magnetic disk, non-volatile memory device, etc.), in which the computer program comprising instructions is configured when executed on a processing device in the form of a programmable integrated circuit (e.g., processor such as CPU, controller, microcontroller, microprocessor, ASIC, etc. or programmable logic device "PLD" such as FPGA, complex programmable logic device "CPLD", etc.) to perform one or more steps of the methodologies disclosed herein. In one embodiment, a group of such processing devices may be selected from the group consisting of CPU, controller, microcontroller, microprocessor, FPGA, CPLD and ASIC. The computer program of instructions may include an ordered listing of executable instructions for implementing logical functions in an information handling system or component thereof. The executable instructions may include a plurality of code segments operable to instruct components of an information handling system to perform the methodologies disclosed herein.

It will also be understood that one or more steps of the present methodologies may be employed in one or more code segments of the computer program. For example, a code segment executed by the information handling system may include one or more steps of the disclosed methodologies. It will be understood that a processing device may be configured to execute or otherwise be programmed with software, firmware, logic, and/or other program instructions stored in one or more non-transitory tangible computer-readable mediums (e.g., data storage devices, flash memories, random update memories, read only memories, programmable memory devices, reprogrammable storage devices, hard drives, floppy disks, DVDs, CD-ROMs, and/or any other tangible data storage mediums) to perform the operations, tasks, functions, or actions described herein for the disclosed embodiments.

For purposes of this disclosure, an information handling system may include any instrumentality or aggregate of instrumentalities operable to compute, calculate, determine, classify, process, transmit, receive, retrieve, originate, switch, store, display, communicate, manifest, detect, record, reproduce, handle, or utilize any form of information, intelligence, or data for business, scientific, control, or other purposes. For example, an information handling system may be a personal computer (e.g., desktop or laptop), tablet computer, mobile device (e.g., personal digital assistant (PDA) or smart phone), server (e.g., blade server or rack server), a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, touch screen and/or a video display. The information handling system may also include one or more buses operable to transmit communications between the various hardware components.

While the invention may be adaptable to various modifications and alternative forms, specific embodiments have been shown by way of example and described herein. However, it should be understood that the invention is not intended to be limited to the particular forms disclosed. Rather, the invention is to cover all modifications, equivalents, and alternatives falling within the spirit and scope of the invention as defined by the appended claims. Moreover, the different aspects of the disclosed methods and systems may be utilized in various combinations and/or independently. Thus, the invention is not limited to only those combinations shown herein, but rather may include other combinations.

What is claimed is:

1. An information handling system, comprising:
   a system memory; and
   a programmable integrated circuit coupled to the system memory, the programmable integrated circuit being programmed to operate in a system management mode (SMM) to respond to a request received from a calling process executing on the programmable integrated circuit for access to at least one encrypted system management interrupt (SMI) function/library stored in the system memory by:
      decrypting the requested SMI function/library from the system memory,
      executing the decrypted requested SMI function/library from the system memory, and
      then re-encrypting the requested SMI function/library in the system memory; and
   where the programmable integrated circuit is programmed to operate in a non-SMM mode during normal operating system runtime, and to respond to receipt of a first system management interrupt (SMI) by:
      entering a first SMM mode, decrypting, loading and executing a first SMI function or library from system memory that corresponds to the first SMM,
      re-encrypting the first SMI function/library in the system memory after executing the first SMI function or library, and
      then exiting the first SMM mode and returning to the normal operating system runtime.

2. The information handling system of claim 1, where the requested SMI function/library in the system storage is a first SMI function/library that is encrypted by a first cryptographic key that is unique to the first SMI function/library and that is different from a second and different cryptographic key that is unique to at least one other second SMI function/library that is stored in the same system memory; and where the programmable integrated circuit is programmed to respond to a request received from a first calling process executing on the programmable integrated circuit by:
      using the first cryptographic key to decrypt the requested first SMI function/library in the system memory prior to executing the decrypted first SMI function/library from the system memory, and
      then using the first cryptographic key to re-encrypt the decrypted first SMI function/library in the system memory after executing the decrypted first SMI function/library.

3. The information handling system of claim 1, where the encrypted SMI function/library is provisioned and stored as part of the system basic input/output system (BIOS) during manufacture or assembly of the information handling system; and where the programmable integrated circuit is programmed to load the encrypted SMI function/library into system memory, and to access the encrypted SMI function/library in system memory to decrypt and execute the encrypted SMI function/library.

4. The information handling system of claim 1, where the programmable integrated circuit is programmed to dynamically add the encrypted SMI function/library at runtime to system basic input/output system (BIOS).

5. The information handling system of claim 1, where the programmable integrated circuit is programmed to respond to receipt of a second system management interrupt (SMI) by:
      entering a second SMM different from the first SMM mode, decrypting, loading and executing a second SMI function or library from system memory that corresponds to the second SMM and that is different from the first SMI function or library;

re-encrypting the second SMI function/library in the system memory after executing the second SMI function or library; and then exiting the first SMM mode and returning to the normal operating system runtime.

6. An information handling system, comprising:

a system memory; and a programmable integrated circuit coupled to the system memory, the programmable integrated circuit being programmed to operate in a system management mode (SMM) to respond to a request received from a calling process executing on the programmable integrated circuit for access to at least one encrypted system management interrupt (SMI) function/library stored in the system memory by:

decrypting the requested SMI function/library from the system memory, executing the decrypted requested SMI function/library from the system memory, and then re-encrypting the requested SMI function/library in the system memory;

where the requested SMI function/library in the system storage is a first SMI function/library that is encrypted by a first cryptographic key that is unique to the first SMI function/library and that is different from a second and different cryptographic key that is unique to at least one other second SMI function/library that is stored in the same system memory; and where the programmable integrated circuit is programmed to respond to a request received from a first calling process executing on the programmable integrated circuit by:

using the first cryptographic key to decrypt the requested first SMI function/library in the system memory prior to executing the decrypted first SMI function/library from the system memory, and then using the first cryptographic key to re-encrypt the decrypted first SMI function/library in the system memory after executing the decrypted first SMI function/library; and where the programmable integrated circuit is further programmed to respond to a request received from a second calling process different from the first calling process that is executing on the programmable integrated circuit for access to the second encrypted SMI function/library stored in the system memory by:

using the first cryptographic key to decrypt the requested second SMI function/library in the system memory prior to executing the decrypted second SMI function/library from the system memory, and then using the first cryptographic key to re-encrypt the decrypted second SMI function/library in the system memory after executing the decrypted second SMI function/library.

7. The information handling system of claim 6, where the programmable integrated circuit is further programmed to decrypt the first SMI function/library only upon receiving the first cryptographic key from the first calling process that is requesting access to the first SMI function/library, and to decrypt the second SMI function/library only upon receiving the second cryptographic key from the second calling process that is requesting access to the second SMI function/library.

8. An information handling system, comprising:

a system memory; and a programmable integrated circuit coupled to the system memory, the programmable integrated circuit being programmed to operate in a system management mode (SMM) to respond to a request received from a calling process executing on the programmable integrated circuit for access to at least one encrypted system management interrupt (SMI) function/library stored in the system memory by:

decrypting the requested SMI function/library from the system memory, executing the decrypted requested SMI function/library from the system memory, and then re-encrypting the requested SMI function/library in the system memory;

where the requested SMI function/library in the system storage is encrypted by a first cryptographic key; and where the programmable integrated circuit is programmed to:

receive the first cryptographic key as provided from the calling process with the request for access to the requested SMI function/library, use the provided first cryptographic key to decrypt the requested SMI function/library in the system memory prior to executing the decrypted requested SMI function/library from the system memory, and then use the provided first cryptographic key to re-encrypt the requested SMI function/library in the system memory after executing the decrypted requested SMI function/library.

9. The information handling system of claim 8, where the programmable integrated circuit is programmed to:

execute the decrypted requested SMI function/library to produce data before re-encrypting the requested SMI function/library in the system memory; and provide the produced data in unencrypted form to the calling process.

10. The information handling system of claim 8, where the programmable integrated circuit comprises one or more memory registers; where the requested SMI function/library in the system storage is encrypted by the first cryptographic key; and where the programmable integrated circuit is programmed to:

execute an operating system (OS) to retrieve the first cryptographic key from the calling process that is requesting access to the SMI function/library, and to store the retrieved first cryptographic key in memory registers of the programmable integrated circuit;

then access the memory registers to retrieve the stored first cryptographic key from the memory registers;

then use the retrieved first cryptographic key to decrypt the requested SMI function/library in the system memory;

then execute the decrypted requested SMI function/library; and then use the retrieved first cryptographic key to re-encrypt the requested SMI function/library in the system memory after executing the decrypted requested SMI function/library.

11. A method, comprising operating a programmable integrated circuit of an information handling system in a system management mode (SMM) to respond to a request received from a calling process executing on the programmable integrated circuit for access to at least one encrypted system management interrupt (SMI) function/library stored in the system memory by:
- decrypting the requested SMI function/library from the system memory;
- executing the decrypted requested SMI function/library from the system memory; and
- then re-encrypting the requested SMI function/library in the system memory;
- where the method further comprises operating the programmable integrated circuit in a non-SMM mode during normal operating system runtime, and then to respond to receipt of a first system management interrupt (SMI) by:
  - entering a first SMM mode, decrypting, loading and executing a first SMI function or library from system memory that corresponds to the first SMM,
  - re-encrypting the first SMI function/library in the system memory after executing the first SMI function or library, and
  - then exiting the first SMM mode and returning to the normal operating system runtime.

12. The method of claim 11, where the requested SMI function/library in the system storage is a first SMI function/library that is encrypted by a first cryptographic key that is unique to the first SMI function/library and that is different from a second and different cryptographic key that is unique to at least one other second SMI function/library that is stored in the same system memory; and where the method further comprises operating the programmable integrated circuit to respond to a request received from a first calling process executing on the programmable integrated circuit by:
- using the first cryptographic key to decrypt the requested first SMI function/library in the system memory prior to executing the decrypted first SMI function/library from the system memory, and
- then using the first cryptographic key to re-encrypt the decrypted first SMI function/library in the system memory after executing the decrypted first SMI function/library.

13. The method of claim 11, where the programmable integrated circuit comprises one or more memory registers; where the requested SMI function/library in the system storage is encrypted by a cryptographic key; and where the method further comprises operating the programmable integrated circuit to:
- execute an operating system (OS) to retrieve the cryptographic key from the calling process that is requesting access to the SMI function/library, and to store the retrieved cryptographic key in memory registers of the programmable integrated circuit;
- then access the memory registers to retrieve the store cryptographic key from the memory registers;
- then use the retrieved cryptographic key to decrypt the requested SMI function/library in the system memory;
- then execute the decrypted requested SMI function/library; and
- then use the retrieved cryptographic key to re-encrypt the requested SMI function/library in the system memory after executing the decrypted requested SMI function/library.

14. The method of claim 11, further comprising operating the programmable integrated circuit to dynamically add the encrypted SMI function/library at runtime to system basic input/output system (BIOS), then load the encrypted SMI function/library into system memory, and then access the encrypted SMI function/library in system memory to decrypt and execute the encrypted SMI function/library.

15. The method of claim 11, further comprising operating the programmable integrated circuit to respond to receipt of a second system management interrupt (SMI) by:
- entering a second SMM different from the first SMM mode, decrypting, loading and executing a second SMI function or library from system memory that corresponds to the second SMM and that is different from the first SMI function or library;
- re-encrypting the second SMI function/library in the system memory after executing the second SMI function or library; and
- then exiting the first SMM mode and returning to the normal operating system runtime.

16. A method, comprising operating a programmable integrated circuit of an information handling system in a system management mode (SMM) to respond to a request received from a calling process executing on the programmable integrated circuit for access to at least one encrypted system management interrupt (SMI) function/library stored in the system memory by:
- decrypting the requested SMI function/library from the system memory;
- executing the decrypted requested SMI function/library from the system memory; and
- then re-encrypting the requested SMI function/library in the system memory;
- where the requested SMI function/library in the system storage is a first SMI function/library that is encrypted by a first cryptographic key that is unique to the first SMI function/library and that is different from a second and different cryptographic key that is unique to at least one other second SMI function/library that is stored in the same system memory; and where the method further comprises operating the programmable integrated circuit to respond to a request received from a first calling process executing on the programmable integrated circuit by:
  - using the first cryptographic key to decrypt the requested first SMI function/library in the system memory prior to executing the decrypted first SMI function/library from the system memory, and
  - then using the first cryptographic key to re-encrypt the decrypted first SMI function/library in the system memory after executing the decrypted first SMI function/library; and
- where the method further comprises operating the programmable integrated circuit to receive and respond to a request received from a second calling process different from the first calling process that is executing on the programmable integrated circuit for access to the second encrypted SMI function/library stored in the system memory by:
  - using the first cryptographic key to decrypt the requested second SMI function/library in the system memory prior to executing the decrypted second SMI function/library from the system memory, and
  - then using the first cryptographic key to re-encrypt the decrypted second SMI function/library in the system memory after executing the decrypted second SMI function/library.

17. The method of claim 16, where the method further comprises operating the programmable integrated circuit to decrypt the first SMI function/library only upon receiving the first cryptographic key from the first calling process that is requesting access to the first SMI function/library, and to decrypt the second SMI function/library only upon receiving the second cryptographic key from the second calling process that is requesting access to the second SMI function/library.

18. A method, comprising operating a programmable integrated circuit of an information handling system in a system management mode (SMM) to respond to a request received from a calling process executing on the programmable integrated circuit for access to at least one encrypted system management interrupt (SMI) function/library stored in the system memory by:
  decrypting the requested SMI function/library from the system memory;
  executing the decrypted requested SMI function/library from the system memory; and
  then re-encrypting the requested SMI function/library in the system memory;
  where the requested SMI function/library in the system storage is encrypted by a first cryptographic key; and where the method further comprises operating the programmable integrated circuit to:
    receive the first cryptographic key as provided from the calling process with the request for access to the requested SMI function/library,
    use the provided first cryptographic key to decrypt the requested SMI function/library in the system memory,
    execute the decrypted requested SMI function/library to produce data and provide the produced data in unencrypted form to the calling process, and
    then use the provided first cryptographic key to re-encrypt the requested SMI function/library in the system memory after executing the decrypted requested SMI function/library.

19. A method, comprising operating a programmable integrated circuit of an information handling system in a system management mode (SMM) to respond to a request received from a calling process executing on the programmable integrated circuit for access to at least one encrypted system management interrupt (SMI) function/library stored in the system memory by:
  decrypting the requested SMI function/library from the system memory;
  executing the decrypted requested SMI function/library from the system memory; and
  then re-encrypting the requested SMI function/library in the system memory;
  where the method further comprises provisioning and storing the encrypted SMI function/library as part of the system basic input/output system (BIOS) during manufacture or assembly of the information handling system; and then operating the programmable integrated circuit to load the encrypted SMI function/library into system memory, and to access the encrypted SMI function/library in system memory to decrypt and execute the encrypted SMI function/library.

* * * * *